United States Patent [19]

Seigh, II

[11] Patent Number: 5,295,262
[45] Date of Patent: Mar. 15, 1994

[54] READ-ONLY ACCESS WITHOUT BLOCKING VIA ACCESS VECTORS

[75] Inventor: Joseph W. Seigh, II, Lake Katrine, N.Y.

[73] Assignee: International Business Machines Corporation, Armonk, N.Y.

[21] Appl. No.: 701,253

[22] Filed: May 16, 1991

[51] Int. Cl.$^5$ .............................................. G06F 15/40
[52] U.S. Cl. .............................. 395/600; 364/DIG. 1; 364/254.6; 364/222.82
[58] Field of Search .................. 364/957.3, 228.1, 228, 364/254.6

[56] References Cited

U.S. PATENT DOCUMENTS 5,113,519  5/1992  Johnson et al. ...................... 395/600

OTHER PUBLICATIONS

Aho et al., *Data Structures and Algorithms*; Addison-Wesley ; 1983.

Primary Examiner—Gareth D. Shaw
Assistant Examiner—Jon Backenstose
Attorney, Agent, or Firm—Sterne, Kessler, Goldstein & Fox

[57] ABSTRACT

A system and method for maintaining linked data structures stored in a computer system capable of processing the stored data as addressable object nodes, such that any data object node may be modified prior to the completion of outstanding read only accesses to that node. The system and method maintain an access vector for each node. The access vectors include an access counter which counts the number of read only accesses from a present node to the next node, and a link pointing to a next node. The number of read only accesses in effect for a node is the sum of access counts of all access vectors pointing to that node, minus the ADJ and minus the sum of access counts of all access vectors with access to that node. A node in the list can be replaced or deleted by first changing the pointers of all nodes that point to the node to point to a new one. Then, modifying the access count of the node by subtracting the maximum value of the access counts pointing to the node from the count in the node. Read only accesses out of the node continue to increment the access count, and when it reaches zero the node can be deleted. Because the pointers to the node had been changed, read only processes can continue without pausing for the change or replacement event.

10 Claims, 8 Drawing Sheets

READ-ONLY ACCESS WITHOUT BLOCKING VIA ACCESS VECTORS

DESCRIPTION

1. Technical Field

The field of the invention relates to operating systems and in particular to multiprocessing operating systems. The preferred embodiment is an implementation of the processing of linked lists where each data object is assigned an access vector and a plurality of read only processes proceed through each element of the list.

2. Background Art

In multiprocessing systems with shared memory, there exists a need to be able to modify large linked data structures without affecting any processes that may be accessing the data structure. This is usually referred to as the "Reader-Writer" problem.

One solution is to have readers check if the "target data" (the data being read) was modified during the read operation. If this condition is met and it is determined that the target data has been modified, the reader merely attempts to read again.

This solution to the Reader-Writer problem may be suboptimal if writers (or modification operations) are relatively frequent and the read operations are of relatively long duration.

A more serious problem arises when the reader is not aware of the validity of the data. This inconsistency is the result of non-atomic grouped sets of operations, which cause processing errors. An atomic set of operations is defined with respect to other processes, (i.e., the grouped set of operations is instantaneous as viewed by other processes, thus, other processes can only see the final result of a grouped set of atomic steps and not partial results).

One solution developed to reduce processing errors is to use pointers to access data. In this process a copy of the target data is produced and the modification operations are conducted on the copy, not the original. The pointer is then changed to point to the new copy. Changing pointers is an atomic operation on most conventional hardware.

It then becomes necessary to determine when prior read operations on the old copy have completed, so that the operating system, for example, knows when it is safe to discard the old copy.

This problem was addressed in U.S. Pat. No. 4,809,168 (the '168 patent). However, the solution proposed in the '168 patent requires software and/or hardware support within the operating system to permit modification of data without locks. As a result the system disclosed in the '168 patent is non-portable.

The '168 patent delays discarding of the old copy until at least all reader processes have checkpointed at least once thereby ensuring that all reader processes have relinquished access to the old copy, because all reader processes must relinquish access before crossing a checkpoint. The problem is finding suitable checkpoints. Further, monitoring such checkpoints may not be feasible for some applications and/or operating systems.

The present system and method is directed to read only access without blocking, but the present invention does not address the problem of coordinating multiple writer processes. However, the present invention does not preclude a solution to the multiple writer problem. For example, it is possible that mutual exclusion may be used in conjunction with the present invention to coordinate multiple writer processes. Hence, the present invention is also applicable to data accessed by multiple processes.

The present system and method is complementary to conventional methods of serialization, such as locking techniques. The present invention has less blocking and therefore permits more efficient read only access.

DISCLOSURE OF THE INVENTION

Prior art reader processes do not access linked data structures at all during modification by virtue of conventional locks, so some mechanism, such as that described above with reference to the '168 patent, must be employed to allow access to the data structure while it is being modified. The present invention employs access vectors which permit read only processes to continue while the list is being modified.

One or more access vectors are created for each data object. Each access vector contains a pointer to other data objects in the data structure and contains a count of transfers of read access from the data object containing the access vector to the data object pointed to by the access vector. Comparison of the counts of transfers of read accesses to a data object and counts of subsequent transfers of read access from the data object allow determination of the number of current read accesses to the data object.

A data structure can be modified by changing the pointers much in the same way that conventional linked data structures are changed. The access counts within the access vectors are adjusted if necessary to ensure accuracy of determination of the current read access counts.

Deletion of a data object from a data structure should first remove all pointers to the data object to ensure no new read accesses to the data object occur, wait until all current read accesses have completed, remove all pointers from the data object to other data objects, and then discard the data object Modifications of the contents of the access vectors are atomic to ensure accurate coordination of reader and writer processes.

The foregoing and other objects, features and advantages of the present invention will be apparent from the following more particular description of preferred embodiments of the invention, as illustrated in the accompanying drawings.

BRIEF DESCRIPTION OF DRAWINGS

The invention will be better understood if reference is made to the accompanying drawings in which.

BEST MODE FOR CARRYING OUT THE INVENTION

A more detailed description of some of the basic concepts discussed in this section is found in a number of references, including "An Introduction to Database Systems", Vols. I and II, by C. J. Date (Addison-Wesley Publishing Company, Inc., 1990).

Figure 1:
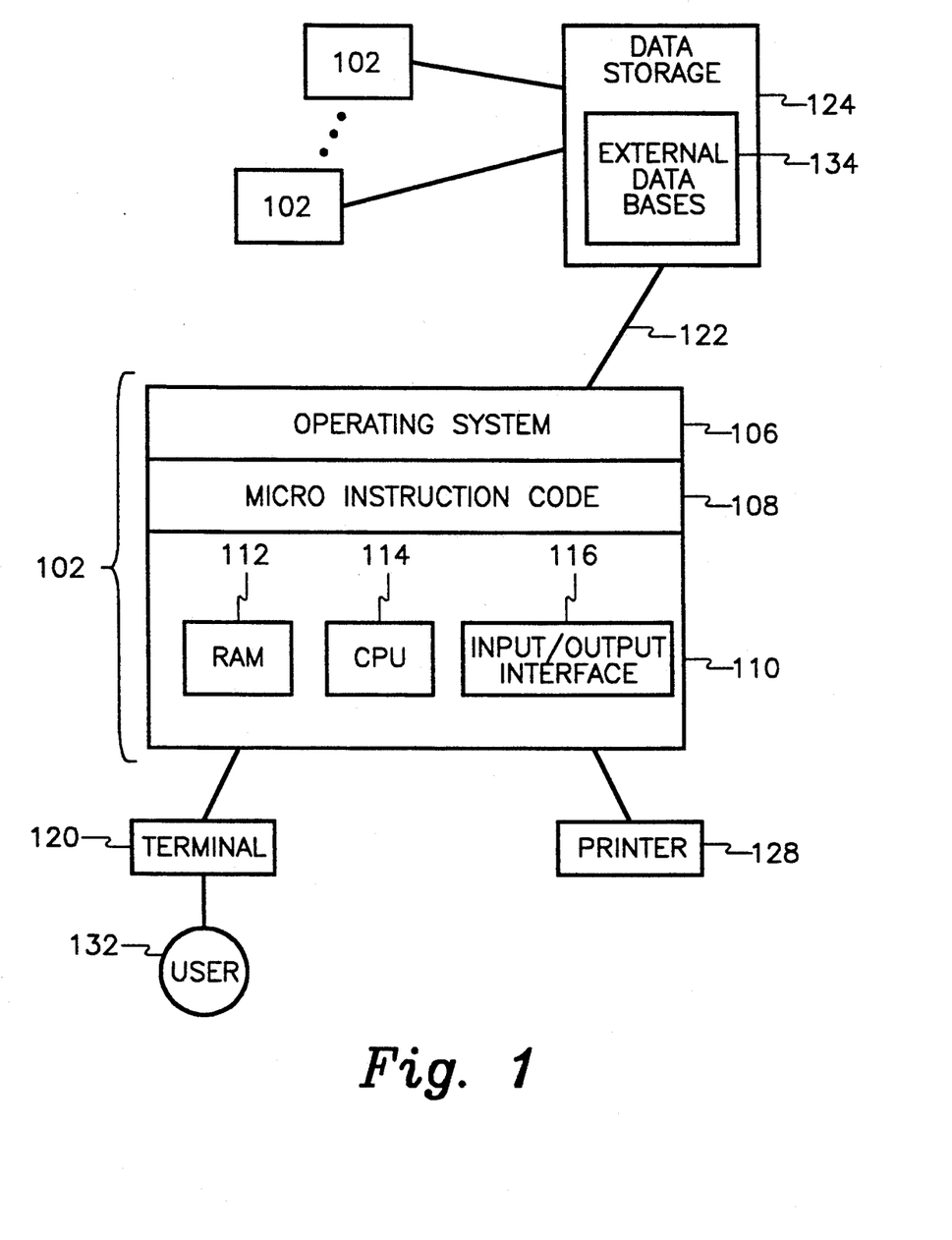
FIG. 1 shows a programming system which can be used to implement the present invention.

An example of a multiprocessor environment depicting a hardware implementation using access vectors in connection with the present invention is shown in FIG. 1. The computer platform 102 (individual processors) include a hardware unit 110, which includes a central processing unit (CPU) 114, a random access memory (RAM) 112, and an input/output interface 116. The RAM 112 is also called a main memory.

Each of the computer platforms 102 may include a micro instruction code 108 (or a reduced instruction set, for instance), and an operating system 106. The access vectors of the present system and method are assigned to data objects in a shared data storage device 124, and may be processed by the operating systems 106. The shared data storage device 124 is also called a secondary storage and may include hard disks and/or tape drives and their equivalents. The data storage device 124 represents nonvolatile storage. An external database 134 may be stored on the shared data storage (or memory) 124.

Various peripheral components may be connected to the computer platform 102, such as a terminal 120, and a printing device 128. The operating system may use virtual memory and manage all paging. A user 132 can interact with the computer platform 102 via a terminal 120.

In a preferred embodiment of the present invention, the computer platform 102 includes a computer having an IBM System 390 architecture. The operating system 106 which runs thereon is an IBM Multiple Virtual Storage (MVS). Those versed in the art will readily understand the equivalents to the above structure.

For introduction purposes, let us first draw a simple analogy between the access vectors of the present invention and the control of a water tank system. In this analogy, the tanks of the water tank system are analogous to data nodes and the water levels within the tanks are analogous to the number of processes having read access to the data nodes.

Given a water tank with one or more input gauges and one or more output gauges, the amount of the tank's current contents can be determined by subtracting the sum of the values of the output gauges from the sum of the values of the input gauges, and adjusting this result by an amount based on the initial values of the gauges and the amount of water initially contained in the tank.

Connecting water tanks together is analogous to a linked data structure. Thus, if one were to remove the input gauges, the tank's contents can still be determined, because every output gauge also functions as an input for its neighbor tank. Additional steps are required in order to insure accurate measurement of the tank's contents. The value of any output gauge being connected must be added to an adjustment value, and the value of any output gauge being disconnected from the adjustment value must be subtracted.

A tank may be discarded after its inputs have been disconnected and it has been drained.

Given these rules, any skilled practitioner of plumbing and elementary accounting should be able to create and modify any arbitrarily complex arrangement of tanks.

Depending of the particular arrangement used, certain economies may be taken. For instance, if only one output gauge is used, the adjustment may be applied directly to the gauge itself.

The present invention uses ACCESS VECTORs to permit read only processes (called "readers") to continue while the list is being modified. One or more ACCESS VECTORs are created and maintained for each data object. The ACCESS VECTOR contains a ACCESS COUNT of the number of accesses to a next data object and a pointer (or LINK) to the next data structure. In connection with the present invention, an ACCESS VECTOR is a data object comprising:

1. a count of accesses performed on the access vector (called an "ACCESS COUNT" or "COUNTER");
2. a POINTER to other data objects ( also called a "LINK"); and, optionally,
3. a DEALLOCATION FLAG, which may be used depending on the specific application.

ACCESS VECTORs may be used for pointers in any arbitrary linked data structure.

Each read only access to a data object causes the ACCESS COUNT in the accessing object vector to be incremented. (I.e., the comparison of the counts of transfers of read accesses to a data object and counts of subsequent transfers of read access from the data object that allow determination of the number of current read accesses to the data object.) The number of read only accesses in effect for a node is the sum of ACCESS COUNTs of all ACCESS VECTORs pointing to that node (hereafter called "IN POINTERs"), minus the ADJ and minus the sum of ACCESS COUNTs of all ACCESS VECTORs with access to that node (hereafter called "OUT POINTERs"). The abbreviated form of the forgoing definition is:

$$\Sigma(IN) - (ADJ + \Sigma(OUT))$$

All operations on a data structure are required to preserve the accuracy of this accounting, either through adjustments to an "adjustment count" (the "ADJ"), or adjustments to the ACCESS COUNTs of the data structure, as necessary.

Optionally, an "adjustment count" (called "ADJ") may be defined for each node (i.e., each data object) to eliminate the necessity of adjustments to ACCESS COUNTs. For the purposes of this disclosure, an ADJ may be considered an ACCESS VECTOR with its LINK pointer permanently set to nil. Propagation of adjustments can be stopped in looped data structures using the ADJ, because the LINK of the ADJ count is always nil.

Traversal of nodes by read processes (called "readers") is accomplished by atomically incrementing the access count (p→av.cnt) and fetching the pointer value (p→av.link).

An atomic operation is defined with respect to other processes, (i.e., the operation is instantaneous as viewed by other processes, thus, other processes can only see the final result of a grouped set of atomic steps and not partial results). This may be implemented via special hardware instructions such as IBM System 390 Compare Double and Swap, or by conventional methods of mutual exclusion such as spin locks, though using spin locks may somewhat deter the advantages yielded by the present invention.

When an IN POINTER is added to a node, the ADJ count for that node is incremented by the value of the IN POINTER's ACCESS COUNT in effect at the time the IN POINTER was added. If no ADJ count exists, then the ACCESS COUNT of a designated OUT POINTER is incremented, and the designated OUT POINTER of any node pointed to by any OUT POINTER thus incremented, is also incremented by the same amount. This adjustment is propagated along the links of subsequent OUT POINTERs until a nil or zero pointer is found.

Note that it may only be possible to adjust some data structures via an ADJ count instead of designated OUT POINTERs if some kind of loop exists within the data structure. Because the above equation must always be satisfied (i.e., the sum of the IN POINTERs minus the sum of the OUT POINTERs must stay the same), designating the OUT POINTERs for adjustment would force the adjustment of another node's IN POINTERS. In such a case, the adjustment would perpetually propagate throughout the loop. Therefore, an ADJ counter must be used in a circular linked list to prevent a continuous propagation of OUT POINTER adjustments to each ACCESS VECTOR in the list.

When an IN POINTER is removed from a node the ADJ count for that node is decremented by the value of the ACCESS COUNT in effect at the time the IN POINTER was removed. Decrements of designated OUT POINTER counts are similar in logic to the above described increment of OUT POINTERS. In other words, the ADJ count for a node is decremented by the value of the ACCESS COUNT in effect at the time the OUT POINTER was removed.

Changing a LINK entails deleting a LINK for one node and adding it to another.

In accordance with the present invention, nodes may be deleted by a polling operation or by a deallocation protocol. The polling operation will be discussed first.

Nodes are deleted by polling by first deleting all LINKs to a node, making it unreachable to readers, then waiting for the number of accesses for the node, i.e.:

$$ADJ + \Sigma(OUT) = 0$$

to become zero, deleting all OUT POINTERs from that node, and finally deallocating the node by setting the DEALLOCATION FLAG if it is used.

Accordingly, a data object (or node) in the list can be replaced or deleted by first changing the LINKs of all objects that point to that data object to point to a changed (or new) object, and then modifying the ACCESS COUNT of the data object by subtracting the maximum value of the ACCESS COUNTs pointing to the object from the value of the ACCESS COUNT in the object. Read only accesses out of the object continue to decrement the object's ACCESS COUNT, and when the object's ACCESS COUNT reaches zero the object can be deleted. Because only the LINKs to the data object had been changed, read only processes can continue without pausing for the change or replacement event.

FIGS. 2A-2I illustrate an example of a simple linked list in conjunction with the present invention. This example shows how the fields of the ACCESS VECTOR change during reader and writer processes. This example also illustrates node deletion according to the deallocation protocol. The above equations are satisfied by each of the modifications made in connection with the example show in in FIGS. 2A-2I. (Note that the examples of FIGS. 2A-2I are used to illustrate the basic operation of the present invention, and an ADJ count is not used.)

Each access vector includes three fields, including an ACCESS COUNT field, a DEALLOCATION FLAG field (0 means that the node is to be deallocated), and a LINK field (0 means no link exists), for left to right, respectively.

Figure 2A:
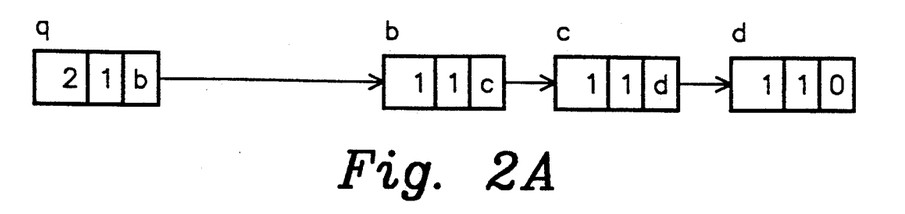
FIGS. 2A-I show access vector fields during various operations in connection with the present invention.

The linked list shown in FIG. 2A is anchored by node q which is used to access the list and is not part of the list itself. The letter in the LINK field of each of the ACCESS VECTORS represents the next node pointed to by that specific ACCESS VECTOR. The LINK in q points to node b, the LINK in b points to node c, etc. The 0 in the LINK of node d signifies that node d is the last node in the linked list.

In FIG. 2A a first reader has completely traversed and exited the listing incrementing all the access counts to 1. A second reader has accessed the first element in the list via the access vector in q and thus incremented q's access count to 2. The reader has fetched q's LINK which points to the next node, node b, then the reader incremented q's ACCESS COUNT and moved on to node b. The reader has not completed the operation(s) at node b.

The number of readers with access to node b can be determined by summing the IN POINTERs (2 from the ACCESS COUNT of node q) and subtracting the sum of the OUT POINTERs (1 at node b), which equals 1 reader. This same analysis in performed on nodes c and d to determine that no readers have access to either node.

Figure 2B:
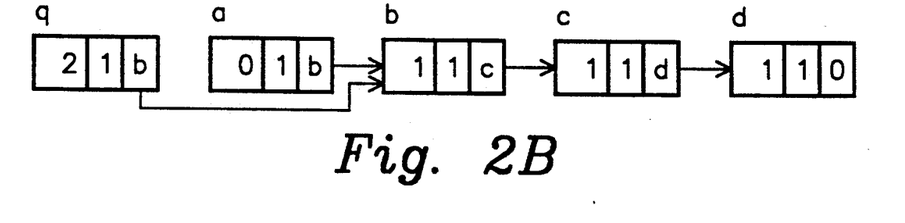

The insertion of a new node a into the list by a writer is shown in FIG. 2B. The ACCESS COUNT of new node a is initially 0, because no reader process has yet accessed the node. (I.e., the sum of the IN POINTERs are 0 at node a.) Therefore, no adjustments need to be made. The LINK in node a points to node b. Node b's ACCESS COUNT has not changed, because adding 0 does not change it.

Figure 2C:
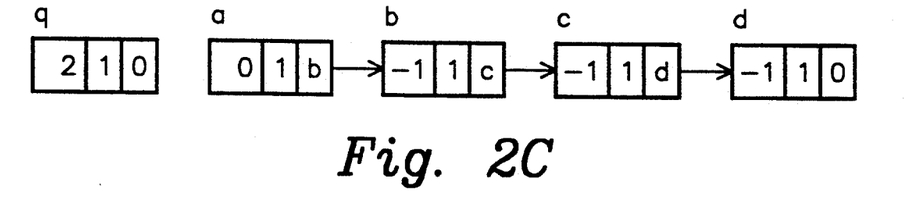

FIG. 2C represents the deletion of an IN POINTER at node b. Node q's OUT POINTER had been deleted and its LINK is set to 0 to reflect this change. In order to satisfy the above discussed formulas for adjusting and maintaining the ACCESS COUNTS for ACCESS VECTOR in connection with the present invention, the ACCESS COUNT of node b must be adjusted.

Node b's ACCESS COUNT is decremented by the value of 2, because node q's ACCESS COUNT was 2 and to maintain the proper number or readers that have accessed node b the ACCESS COUNT must be changed to −1. To check if the number of readers that have accessed node b is correct, plug the values into the formulas. Zero IN POINTERs minus −1 ACCESS COUNT yields 1, which is the correct number of readers that have accessed node B. (Recall that the ACCESS COUNT is the same as the sum of the value of the OUT POINTERs.)

The ACCESS COUNT propagates down the linked list. The proper number of readers that have access to nodes c and d must also be valid upon inspection of their respective ACCESS COUNTs. Thus, the ACCESS COUNTs of nodes c and d are also −1.

Figure 2D:
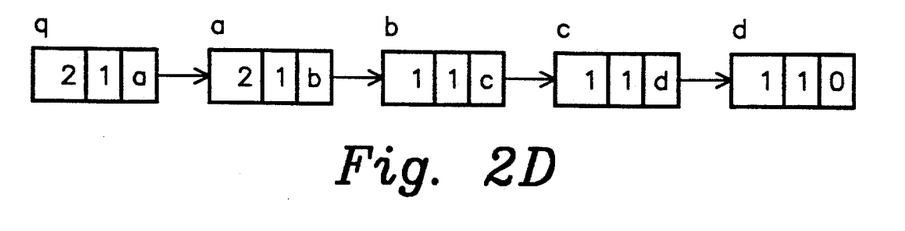

The transition from FIGS. 2B to 2D shows the switching of the OUT POINTER of q from b to a. The above discussed deletion of q's LINK to b was to illustrate an intermediate step in the process of switching q's LINK. In practice, however, this will never be seen because the link is switched, not deleted. Hence, adding the LINK from node q to node a will add 2 to all subsequent ACCESS COUNTs giving the result shown in FIG. 2D.

The ACCESS COUNT of node a is 2, because no readers have accessed node a. (The sum of the IN POINTERs to node a is 2, from node q, minus node a's ACCESS COUNT which is 2, yields 0 readers at node a. The sum of the IN POINTERs to node b is 2, from node a, minus b's ACCESS COUNT which is 1, yields 1 reader at node b. Likewise for nodes c and d.)

Figure 2E:
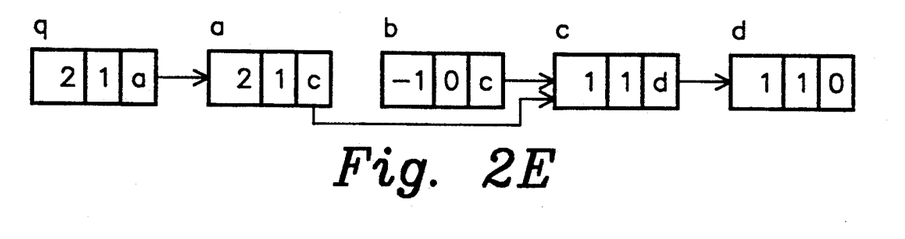

Next, the delinking of node b is shown in FIG. 2E. Node a's LINK is switched from node b to node c. The ACCESS COUNT of node b is changed to −1 to reflect the fact that one reader still has access to node b (0 IN POINTERS minus 1 OUT POINTER equals −1). (Note that there are no readers at nodes c and d). The DEALLOCATION FLAG of node b is then set to 0.

The ACCESS COUNTs of nodes c and d appear unchanged. However, their ACCESS COUNTs did change during node b's deallocation. When node a's OUT POINTER is removed from node b the ACCESS COUNT of nodes b and c changed from 1 to −1. Then, node c's ACCESS COUNT changed back to 1 when node a's LINK was changed to point to node c. The ACCESS COUNT of node d tracked the changes to the ACCESS COUNT of node c.

Figure 2F:
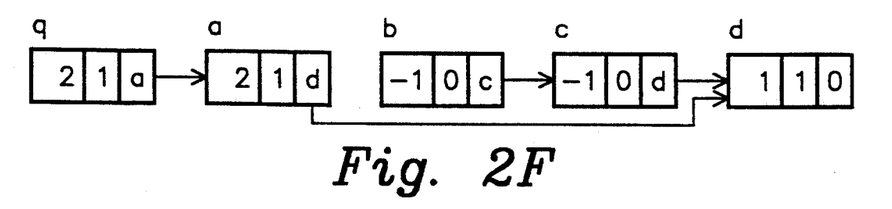

Similarly, the deallocation of node c is shown in FIG. 2F. In this case, since the LINK from node a is removed from node c, node c's ACCESS COUNT is reduced by 2 from 1 to −1. For that matter, the ACCESS COUNT of node d would be reduced by 2 from 1 to −1, but the addition of the new IN POINTER from node a increases node d's ACCESS COUNT from −1 back to 1. Node c can then be deleted because no readers have access to it. Alternatively, node c need not be deleted immediately, because if the reader was to move off node b and onto node c, the reader would see that the deallocation flag was set and the reader would delete node c and move onto node d.

Figure 2G:
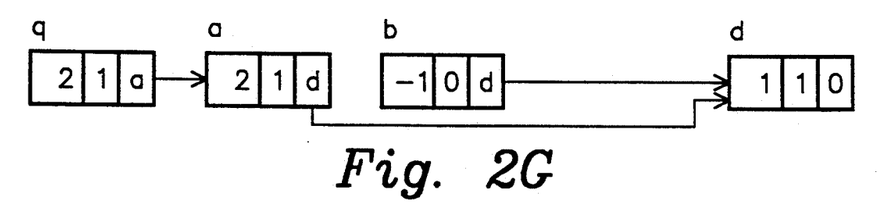

FIG. 2G shows the optional deletion of node c from the linked list. Node b's LINK is changed to point to node d, thus, node d's ACCESS COUNT remains unchanged. When a node is removed from the list the system no longer keeps track of it. Node d's ACCESS COUNT is 1. The sum of the IN POINTERs to node d is 2−1=1, minus the ACCESS COUNT 1, equals 0 readers at node d.

Figure 2H:
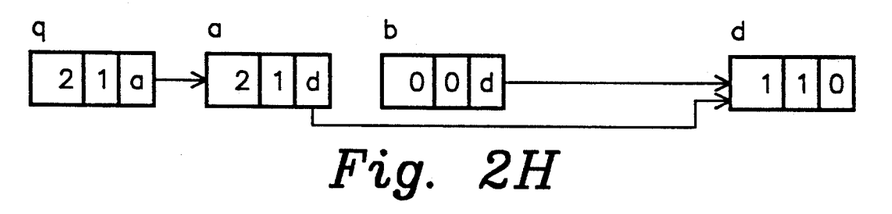

The reader process moves off node b and onto node d, as shown in FIG. 2H, and the reader increments node b's ACCESS COUNTER. Node b's ACCESS COUNT becomes 0, and node b is safe to delete from the list. At node d, the sum of the IN POINTERs (2 form node a) minus the ACCESS COUNT (1) equals 1 reader process. Once the DEALLOCATION FLAG is set and the ACCESS COUNT is (or would be) zero, and "b" is deallocated.

Figure 2I:
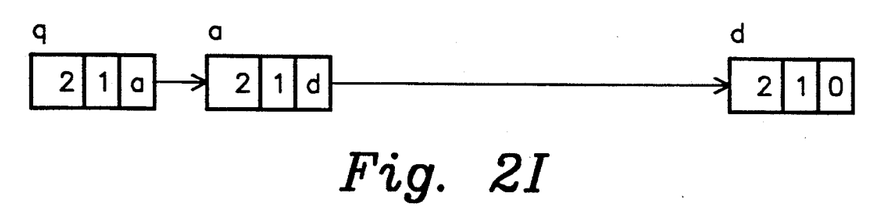

FIG. 2I shows the deletion of node b and the exit of the reader process from the list. Node d's ACCESS COUNT was incremented to 2 by the departing reader process.

The following is an example of pseudo code for node traversals in connection with the present invention:

| Node Traversal |
| --- |
| {{ p→av.cnt=p→av.cnt+1<br>p=p→av.link<br>}} |

The above reader traversal process is atomic as indicated by the double braces {(...)}. The symbol "p→" represents a pointer variable pointing to a node. The notation "av." denotes a variable as being a field within the record data structure "av".

The first step to accomplish a traversal from one node to the next is to increment the value of the ACCESS COUNT (av.cnt) of the present node that p is pointing to. The second step is to fetch the value of the next node's LINK field (av.link), which is the pointer to the next node in the list. The above logic may be substituted in convention systems to replace the conventional logic used to pick up the next link is the list.

One way to determine whether a node should be deleted is to have the writer delete the node if the difference between the OUT POINTER counts and IN POINTER counts is zero. This is called "polling".

Instead of polling (i.e., entering a loop to wait for the number of accesses by readers on a particular node to become zero), the write process (called the "writer") may delegate the responsibility of deallocating the node to the last reader with access to the node. This is sometimes called obligation passing. Accordingly, a protocol for recognition of this obligation is incorporated into the present system and method. Hence, the deletion of nodes in conjunction with the present invention may be done by polling or with the deallocation protocol. Both of these processes will be discussed in further detail below.

The following is an example of pseudo code used for changing a link in connection with the present invention:

| Changing a Link |
| --- |
| old_link=p→av.link<br>{{<br>  temp_cnt=p→av.cnt<br>  p→av.link=new_link<br>}}<br>if old_link ≠ nil then<br>  old→adj=old→adj−temp_cnt<br>end if<br>if new_link ≠ nil then<br>  new→adj=new→adj+temp_cnt<br>end if |

Figure 3:
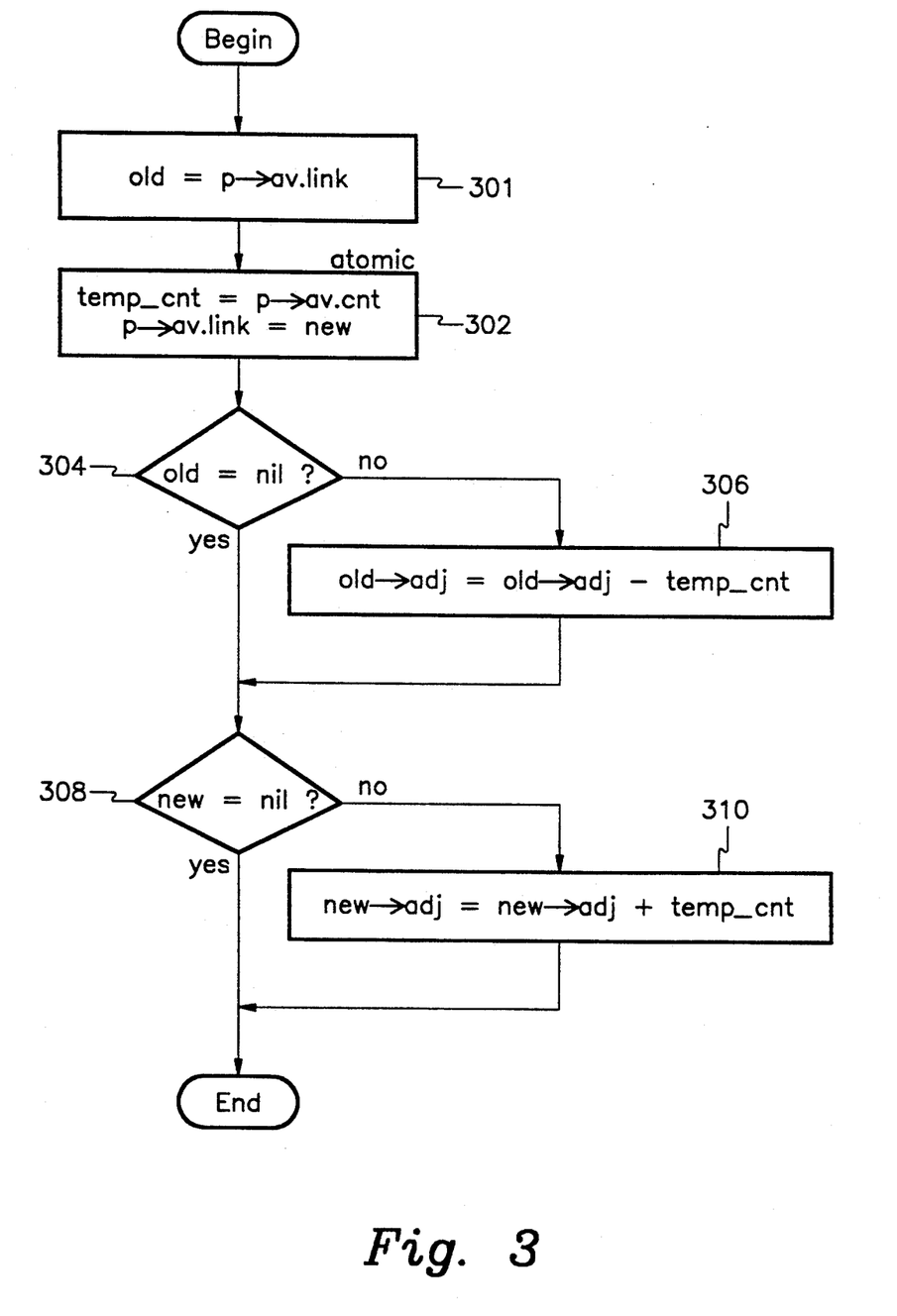
FIG. 3 shows a flow chart depicting a link modification operation in connection with the present invention.

A flow chart corresponding to the above pseudo code is shown at FIG. 3. The first step is to set the variable "old_link" equal to the value of the LINK of the present node (i.e., old_link=p→av.link; see block 301). The second step shown at block 302 is atomic: a temporary counter (temp_cnt) is set to the ACCESS COUNT (p→av.cnt) of the present node, and the pointer "new_link" pointing to the next node is stored in the current LINK field (p→av.link).

Next, the old_link value is evaluated at a conditional block 304. If the old ACCESS COUNT is not equal to zero (or "nil"), the old ADJ count (old_adj) is reduced by the temporary counter (temp_cnt), as shown at block 306. Flow then proceeds to a conditional block 308. Likewise, if the old ACCESS COUNT is verified as nil at the conditional block 304, the process flow continues to the conditional block 308.

The value of new_link is then evaluated, as shown at the conditional block 308. If the value of new_link is not nil, the new ADJ count (new adj) is reduced by the temporary counter (temp_cnt), as shown at block 310. Flow then continues. Likewise, the process is complete if the new pointer value is verified as nil at the conditional block 308.

The logic for addition of a node will also utilize the above described steps, as will become evident to those skilled in the art. Because links can be used as soon as they are added, in general, links from a new node should be added before any links are added to a new node.

The following is an example of the pseudo code for deletion of a node using the deallocation protocol. The following protocol uses the DEALLOCATION FLAG field of the ACCESS VECTOR.

---

Node Deletion

```
delete in-pointer links
{{
   temp_adj=p→adj
   p→adj=0
}}
for all out-pointers
   {{
      p→av.flg=deallocate
      temp_cnt=p→av.cnt
   }}
   temp_adj=temp_adj − temp_cnt
end for
{{
   temp_adj=temp_adj+p→adj
   p→adj=temp_adj
}}
if temp_adj=0 then
   delete out-pointer links
   deallocate node
end if
```

---

Figure 4:
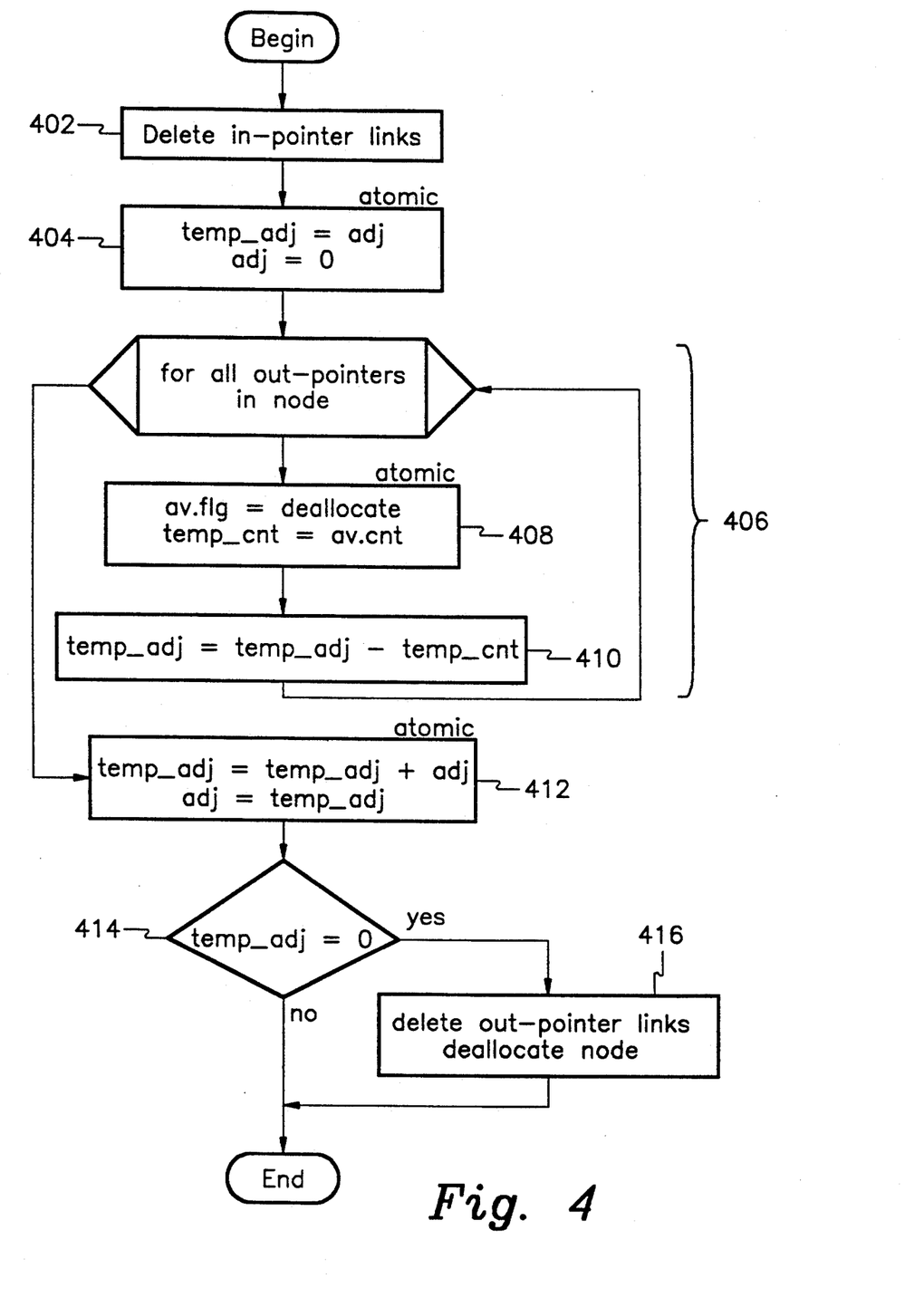
FIG. 4 shows a flow chart depicting a node deletion operation in connection with the present invention.

The logic for deletion of a node corresponding to the above pseudo code is also shown in a flow chart at FIG. 4. The process flows as follows: first, the node is made unreachable to readers (by deleting all LINKs to the node) as shown at 402; next, the following steps are performed by the writer:

1. The current value of ADJ is saved in a local temporary variable "temp_adj", and then ADJ is set to zero (see block 404).
2. The DEALLOCATION FLAG is set (i.e., av.flg=deallocate), and a local temporary variable "temp_cnt" is set equal to the present ACCESS COUNT (see atomic the block 408 of the iterative structure 406, where temp_cnt =av.cnt). Then, the temporary adjustment counter is reduced by the temporary counter, as shown at block 410 (i.e., temp_adj=temp adj-temp_cnt).
3. The temporary adjustment counter is changed by the ADJ (which may change during step 406 and may not be zero; see temp_adj=temp_adj+adj), and then stored in the ADJ (adj=temp_adj), as shown at atomic block 412.
4. If the result was zero (i.e., temp_adj=0), the OUT POINTER links are deleted and the node is deallocated, as shown at conditional block 414 and block 416, if not, process flow continues.

The logic for deletion of the OUT-POINTERS in step 4 is the same as that described in connection with FIG. 2. If the above process continues and the temp_adj is not 0, the reader process is passed the obligation of node deletion.

The following is an example of pseudo code for readers traversing nodes with deallocation protocol.

---

Node Traversal with Deallocation

```
{{
   p→av.cnt=p→av.cnt+1
   temp_flag=p→av.flg
   temp_link=p→av.link
}}
if temp_flag=deallocate then
   {{
      temp_adj=p→adj+1
      p→adj=temp_adj
   }}
   if temp_adj=0 then
      delete out-pointer
links
      deallocate node
   end if
end if
p=temp_link
```

---

Figure 5:
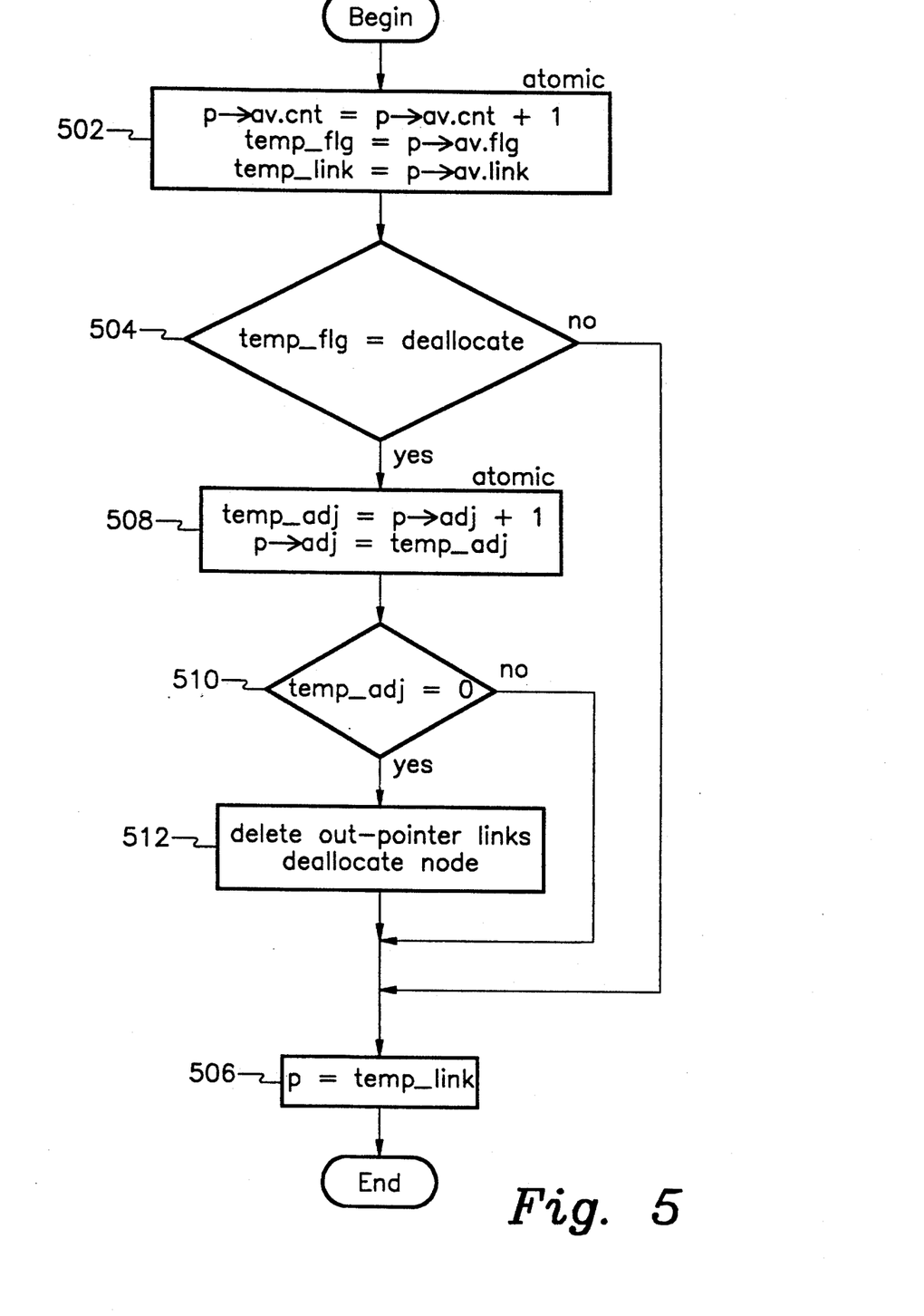
FIG. 5 shows a flow chart depicting a node traversal operation in connection with the present invention.

The logic for readers traversing nodes is shown in FIG. 5 and described below.

1. The reader atomically increments the ACCESS COUNT (p→av.cnt=p→av.cnt +1), and fetches a copy of the DEALLOCATION FLAG field and the LINK field (see temp_flag=p→av.flg and temp_link=p→av.link at block 502).
2. If the DEALLOCATION FLAG is not set (see the conditional block at 504), the reader sets the temporary link value equal to the new_link pointer value (see p=temp_link at block 506).
3. If the DEALLOCATION FLAG is set, the reader atomically increments the ADJ count and saves a copy of the result (see temp_adj=p→adj+1 and p→adj=temp_adj at block 508).
4. The reader next determines if the ADJ count is zero (see conditional block 510). If so, the reader deletes the OUT POINTER links and deallocates the node as discussed above with reference to FIG. 3 (see block 512).
5. Finally, the new_link pointer is set at block 506.

In the above example the ADJ count is used to coordinate reader/writer deletion of the node. A designated OUT POINTER ACCESS COUNT could be used as has been mentioned earlier, but depending on the data structure, the operation could become overly complicated.

Optimizations for a linked list in connection with the present invention will now be addressed. Linked lists enable simpler and more efficient modification techniques, because they have only one OUT POINTER and are iterative in nature. The single OUT POINTER of the linked list becomes the designated ADJ count for implementation of the present system and method.

The linked list insert and delete node operations involve delinking and linking of the same sublist with the same increment and decrement count that propagates through the sublist, thus canceling each other. Hence, it is only necessary to adjust the count in the node being added or deleted.

The following is pseudo code for the insetion of a link in a linked list structure:

| Linked List Insertion |
| --- |
| new_link→av.link = next<br>{{<br>   new→av.cnt = prev→av.cnt<br>   prev→av.link = new_link<br>}} |

Figure 6A:
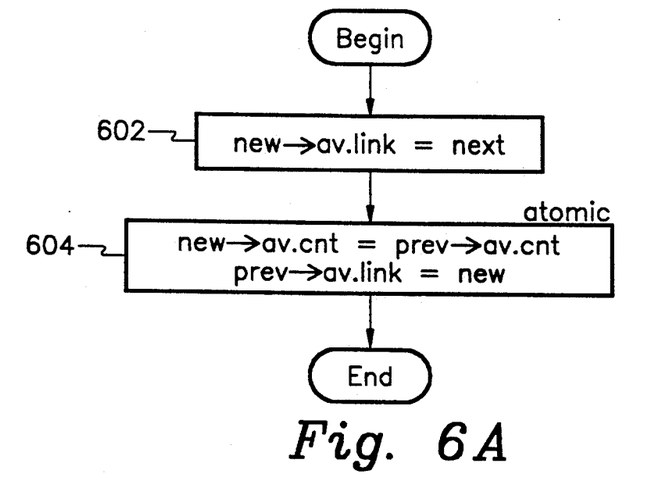
FIGS. 6A-C show flow charts depicting linked list traversal, linked list traversal with deallocation protocol and linked list node deletion with deallocation protocol in connection with the present invention.

A writer performs the following steps to add a new node to a linked list in connection with the present invention. The example in FIG. 6A involves three nodes. The node labeled "previous" is similar to node q of FIG. 2a. It follows that node "new" is similar to node a, and that node "next" is similar to node b.

1. The writer establishes a link from the new node to the next node (new→av.link=next; see block 602 of FIG. 6a and FIG. 2b).
2. Then, atomically, the writer:
   (a) sets the new node's ACCESS COUNT to the previous node's ACCESS COUNT (i.e., new-→av.cnt=prev→av.cnt), and
   (b) stores the address of the new node in the LINK field of the previous node (i.e., prev→av.link-=new_link; see block 604 of FIG. 6a and FIG. 2d).

The logic for deletion of a link is as follows (also, see FIG. 6B):

| Linked List Deletion |
| --- |
| {{<br>   prev→av.link = cur→av.link<br>   temp_cnt = prev→av.cnt<br>}}<br>{{<br>   cur→av.flag = deallocate<br>   temp_cnt = cur→av.cnt − temp_cnt<br>   cur→av.cnt = temp_cnt<br>}}<br>if temp_cnt = 0 then<br>   deallocate node<br>end if |

Again, referring back to FIG. 2e, in the example of linked list deletion the node "current" is similar to node b and node "previous" is similar to node a.

Figure 6B:
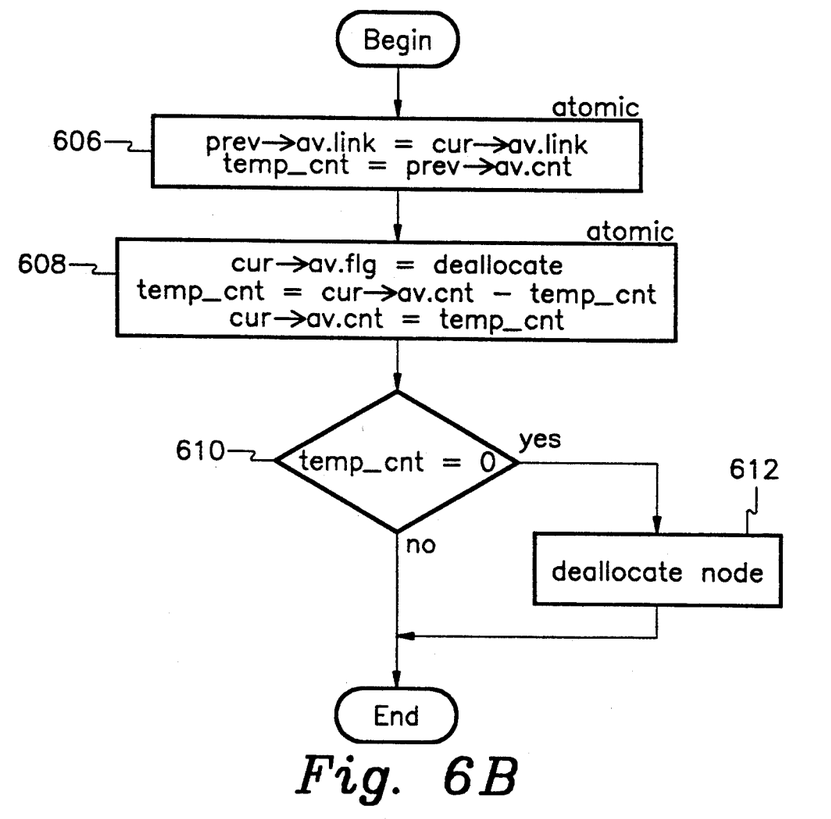

1. Atomically, the writer:
   (a) switches the IN POINTER of the node being deleted to point to the next node by storing the current LINK value in the previous LINK value, and
   (b) stores the previous ACCESS COUNT value in a temporary variable (temp_cnt), by storing the current LINK value as the previous LINK value and storing the previous ACCESS COUNT value as the temporary count value (see prev-→av.link=cur→av.link and temp_cnt=prev-→av.cnt in block 606; in FIG. 2e, cur→av.link would be a pointer to node c).
2. Atomically, the writer sets the DEALLOCATION FLAG (i.e., cur→av.flag=deallocate), and subtracts the temporary count from the ACCESS VECTOR COUNT field value at the time the FLAG was set, and stores the result back in the temporary count (see temp_cnt=cur→av.cnt−temp_cnt at block 608). The current ACCESS COUNT is then set equal to the temporary count (cur→av.cnt=temp_cnt).
3. If the OUT POINTER access count (i.e., the temporary count) is zero (see conditional block 610), the node is deallocated, as shown at block 612 (i.e., if temp_cnt=0, then, deallocate node). If the condition is not met the process merely continues and the reader is forced to do any necessary node deletion.

Note: Because the ACCESS COUNT is zero and the node is being deallocated, there is no need to delete the OUT POINTER link first.

If unreachable nodes (i.e., non-linked nodes), are being kept track of, the IN POINTER links of those nodes could be deleted as well. However, it is not necessary because traversal using the above logic will handle these cases.

The following is pseudo code for traversal of a linked list (also, see FIG. 6C):

| Linked List Traversal |
| --- |
| {{<br>   temp_cnt = cur→av.cnt + 1<br>   cur→av.cnt = temp_cnt<br>   temp_flg = cur→av.flg<br>   temp_link = cur→av.link<br>}}<br>if temp_flg = deallocate &<br>   temp_cnt = 0 then<br>   deallocate node<br>end if<br>cur = temp_link |

Figure 6C:
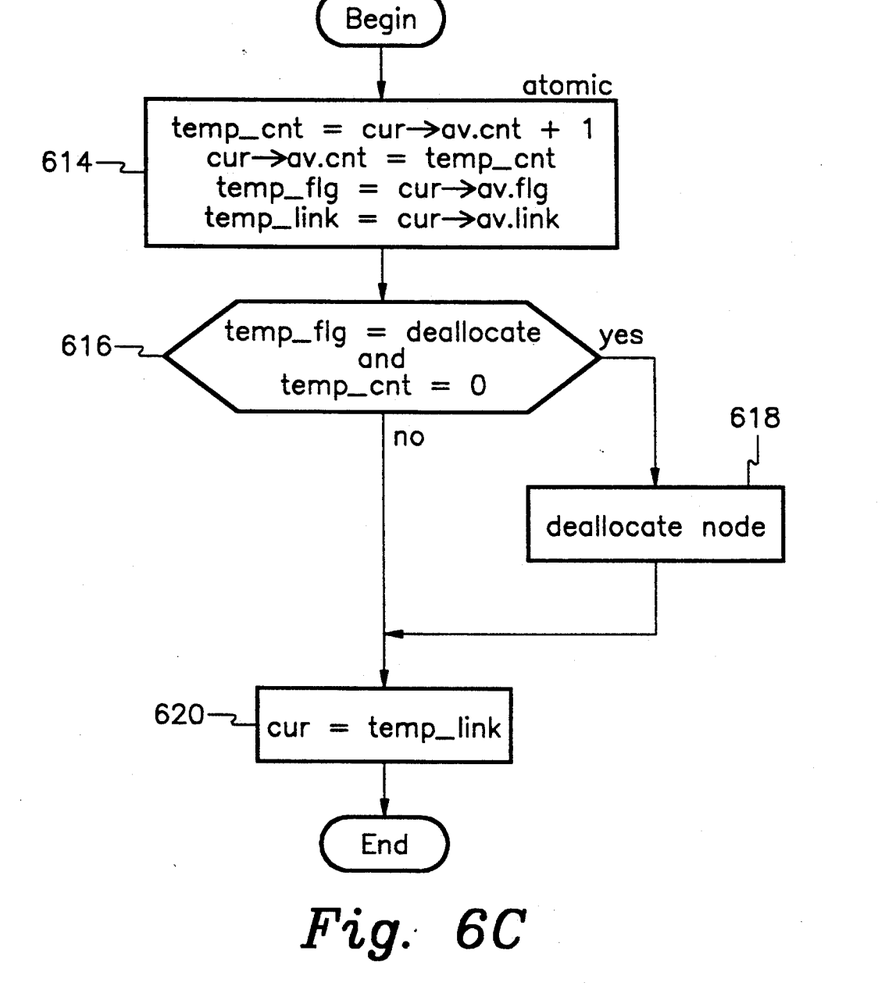

According to the above logic, a reader performs the following steps to traverse nodes in a linked list (see FIG. 6C):

1. In the first set of atomic processes:
   (a) the ACCESS COUNT is incremented and the result is stored back in the current ACCESS COUNT (i.e., temp_cnt=cur→av.cnt+1; cur-→av.cnt→temp_cnt),
   (b) the current DEALLOCATION FLAG is fetched and is then stored as a temporary flag (i.e., temp_flg=cur→av.flg), and
   (c) the current LINK value is fetched and is stored as a temporary link (i.e., temp_link=cur→av.-link). This first set of processes are shown at block 614 of FIG. 6.
2. If the DEALLOCATION FLAG is set and the result of ACCESS COUNT increment was zero, (i.e., temp_flg=deallocate and temp_cnt=0; see conditional block 616 at FIG. 6), then the node is deallocated, as shown at block 618. If not, the reader continues by storing the temporary link as the current LINK value, as shown at block 620.

An example of traversal logic in IBM System 390 assembler will now be described to illustrate the efficiency of the present invention. The access vector, AVEC, is a 64 bit doubleword defined as follows:

bits 0-30 represent the access count (as a 31 bit unsigned integer).
bit 31 represents the deallocation flag (0 means deallocate),
bits 32-63 represents the link (pointer).

| | | | |
| --- | --- | --- | --- |
| | LM | 0,1,AVEC | Fetch contents of AVEC |
| LOOP | DS | 0H | |
| | LA | 14,2 | |
| | LR | 15,1 | Copy for CDS |
| | ALR | 14,0 | Increment count and simultaneously test count and deallocation flag |
| | BC | 10,DEALLOC | Count=0 and deallocate |

-continued

```
                              set
           CDS  0,14,AVEC     Update AVEC
           BE   END           Update succeeded, exit
           B    LOOP          Update failed, retry
DEALLOC    DS   0H
... node deallocation code here
END        DS   0H
           LR   2,1           Address next node
```

The contents of the ACCESS VECTOR (AVEC) are loaded into registers 0 and 1 at Load Multiple (LM) 0,1 AVEC. (Register 0 is loaded with bits 0–31, the ACCESS VECTOR, and the last bit is loaded with the DEALLOCATION FLAG. Register 1 is loaded with the LINK pointer. The term "LOOP" is a label and the Declare Storage (DS 0H) is a placeholder for the label.)

In the loop, the constant 2 is loaded into register 14 by the command Load Address (LA) 14,2. The 2 is "10" in binary; therefore, a 1 is placed in bits 0–30 of register 14, and a 0 is placed in bit 31. A mapping out of the ACCESS VECTOR in register 14 would yield a 1 in the ACCESS COUNT field, and a 0 in the FLAG field.

Next, a 1 is loaded into register 15 by the command Load Register (LR) 15,1. Add Logical Register (ALR) 14,0 adds the contents of register 0 to the contents of register 14. This command increments bits 0–30 (the ACCESS COUNT) which sets the condition code according to the results of the operation.

Branch on Condition (BC) 10, where decimal 10 is a binary mask "1010", permits simultaneous testing for condition codes 0 and 2. For add logical, the result is a 0 with no carry or a 0 with carry, respectively. The carry bit is ignored. If the result of the ALR is not 0, the Compare Double and Swap (CDS) 0,14 AVEC command is executed. Registers 0 and 1, which contain the old value of the ACCESS VECTOR, will be compared to registers 14 and 15, which contain the new value of the ACCESS VECTOR. The Branch on Equal condition (BE) will test if the ACCESS VECTOR has changed between the original fetch of its contents and the time it was updated. If it was updated the process will exit the loop by jumping to END. If no update was done, a new copy of the ACCESS VECTOR is fetched in order to try the procedure again from the beginning of the loop.

When the process leaves the loop, the address of the next node is loaded into the ACCESS VECTOR by the LR 2,1 command.

A more detailed discussion of the assembler language concepts discussed above may be found in an operation manual titled, "IBM Enterprise Systems Architecture/390, Principles of Operation", (Publication No. SA22-7205).

Counter arithmetic overflow is not a problem, since the counters "wrap" to zero. As long as there are less than $2^-1$ reader processes accessing the linked list, the logic of the present system and method will still work.

For accessing a simple anchored control block, the implementation using the present invention is approximately twice as efficient as the method using spin locks to achieve the same amount of granularity (i.e., the size of the unit of locking, like field or record units, for example).

A spin lock is usually implemented by compare and swap logic. To achieve the same level of granularity, two spin locks would have to be used; one for accessing the link to the object, and another for accessing the data object itself. Every visitation of the object by a reader process would entail acquiring the spin lock for the link, accessing the object, acquiring the spin lock for the object, releasing the spin lock for the link, and after completing the visitation of the object, releasing the spin lock for the object. Four compare and swaps (plus ancillary code) are required by the conventional spin lock technique, verses two for the access vectors of the present invention.

Because read access by means of the present invention is independent of conventional techniques, processes with read access can do things not usually possible with conventional techniques, such as: acquiring write (exclusive) access while still holding read access; and removing a currently accessed node from the list. The present invention can also allow a list lookup for the purpose of removing a node without acquiring exclusive access immediately, thus minimizing the amount of exclusive access held.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents. It will be understood by those skilled in the art that various changes in form and detail may be made therein without departing from the spirit abd scope of the invention.

What is claimed is:

1. A computer implemented method for maintaining a linked data structure stored in a computer system capable of processing the stored data as addressable object nodes, such hat any node may be modified prior to the completion of outstanding read only accesses to said any node, comprising the steps of:

maintaining an access vector for each of the nodes, each access vector including an access counter for maintaining an access count value corresponding to how many processes have read access to a first node, and a link for maintaining a pointer to a next node;

adding one or more links to the data structure, wherein when a link associated with an access vector is added to point to a second node, the value of the access count of the second node and the value of the access counts of all nodes indirectly pointed to by the added link are incremented by the value of the access count of the access vector associated with the added link;

deleting links from the data structure, wherein when a link associated with an access vector is deleted from a third node, the value of the access count of the third node and the value of the access counts of all nodes previously indirectly pointed to by the deleted link are decreased by the value of the access count of the access vector associated with the deleted link; and deleting nodes by:
   deleting all links to a fourth node,
   waiting until an access count for said fourth node becomes zero, said access count becoming zero as readers complete their respective read operations at said fourth node,
   deleting all links from said fourth node to further nodes, and deallocating said fourth node.

2. A method according to claim 1, further comprising the step of maintaining a second count of reader accesses to said node to thereby eliminate access propagation in circular linked lists.

3. A computer implemented method for maintaining a linked data structure stored in a computer system capable of processing the stored data as addressable object nodes, such that any node may be modified prior to the completion of outstanding read only accesses to that node, comprising the steps of:

maintaining an access vector for each of the nodes, each access vector including an access counter for maintaining an access count value corresponding to how many processes have read access to a first node, a link for maintaining a pointer to a next node and a deallocation flag for indicating to readers whether to delete the first node;

maintaining further access vectors for the nodes, each of the further access vectors including an adjustment counter for maintaining a value corresponding to how many processes have read access to a second node and a nil link for stopping propagation of adjustments to the data structure, wherein said adjustment counter eliminates the necessity of adjustments to an access count of an access vector associated with said adjustment counter;

adding one or more links to the data structure, wherein when a link associated with an access vector is added to point to a third node, the value of the access count of the third node and the values of the access counts of all nodes indirectly pointed to by the added link are incremented by the value of the access count of the access vector associated with the added link;

deleting links from the data structure, wherein when a link associated with an access vector is deleted from a fourth node, the value of the access count of the fourth node and the value of the access counts of all nodes previously indirectly pointed to by the deleted link are decreased by the value of the access count of the access vector associated with the deleted link; and deleting a fifth node by:
(1) deleting all links pointing to said fifth node to thereby make said fifth node unreachable by readers;
(2) atomically saving a current value of an adjustment counter for said fifth node in a temporary adjustment counter, and setting said adjustment counter of said fifth node to zero;
(3) for all out-pointer links in said fifth node:
atomically setting the deallocation flag for said fifth node, and setting the value of the access counter of said fifth node equal to a temporary access counter; and
reducing said temporary adjustment counter by said temporary access counter;
(4) atomically changing said temporary adjustment counter by adding to it said adjustment counter, and storing said temporary adjustment counter result back into said adjustment counter; and
(5) if the result in step 4 was zero, deleting said out-pointer links of said fifth node and deallocating said fifth node.

4. A computer implemented method for maintaining linked data structures stored in a computer system capable of processing the stored data as addressable object nodes, such that any node may be at least one of modified and traversed prior to the completion of outstanding read only accesses to said any node, comprising the steps of:

maintaining an access vector for each node;

designating an access pointer for each access vector, said access pointer pointing to the location of a next node;

designating an access counter for each access vector, said access counter maintaining the number of read only accesses to said next node; and traversing from a first node to a second node by:
(1) incrementing the access counter of said first node, and
(2) fetching the access pointer of said second node, wherein said second node is the next node with respect to said first node.

5. A method according to claim 4, wherein the modification includes one of a replacing operation and a deleting operation, comprising the steps of:
(1) acquiring all access pointers pointing to said first node and replacing said acquired pointers with a different data object pointer;
(2) subtracting the largest of said access counts pointing to said first node from the access counter of said first node and storing the result in said first node access vector;
(3) continuing to increment said first node's access count for each subsequent access to said first node; and
(4) deleting said first node when said access count reaches zero.

6. A method according to claim 4, further comprising the step of maintaining a second count of reader accesses to said node to thereby eliminate access propagation in circular linked lists.

7. A system for maintaining linked data structures stored in a computer capable of processing the stored data as addressable object nodes, such that any data object node may be at least one of modified and traversed prior to the completion of outstanding read only accesses to said any data object node, comprising:

first means for maintaining an access vector for each data object node, said access vector including an access pointer which points to the location of a next node, and an access counter which maintains the number of read only accesses to said next node; and second means for performing read only accesses from a first node to a second node, comprising:
(a) means for incrementing the access counter of the first node; and
(b) means for fetching the access pointer of the second node, and thereby determining the address of the second node, wherein the second node is the next node with respect to the first node.

8. A system according to claim 7, wherein the modification includes one of a replacing operation and a deleting operation, comprising:
(a) first means for acquiring all access pointers pointing to a first node and replacing said acquired pointers with a different data object pointer;
(b) second means for subtracting the sum of said access counts pointing to said first node from the access counter of said first node and storing the result in said first node access vector;

(c) third means for continuing to increment said first node's access count for each subsequent access to said first node; and (d) fourth means for deleting said first node when said access count reaches zero.

9. A system according to claim 8, further comprising fifth means for maintaining a second count of reader accesses to said node to thereby eliminate access propagation in circular linked lists.

10. A system according to claim 7, wherein the modification includes one of a replacing operation and a deleting operation, comprising:

(a) first means for deleting all links pointing to said node to thereby make it unreachable by readers;

(b) second means for atomically saving the current value of the adjustment counter for said node in a temporary adjustment counter, and setting said adjustment counter to zero;

(c) for all out-pointer links in said node third means for:

atomically setting the deallocation flag for said node, and setting the value of the access counter of said node equal to a temporary access counter; and reducing said temporary adjustment counter by said temporary access counter;

(d) fourth means for atomically changing said temporary adjustment counter by adding to it said adjustment counter, and storing said temporary adjustment counter result back into said adjustment counter; and (e) fifth means for deleting said out-pointer links of said node and deallocating said node if the result in step d was zero.

* * * * *